Patented Aug. 23, 1927.

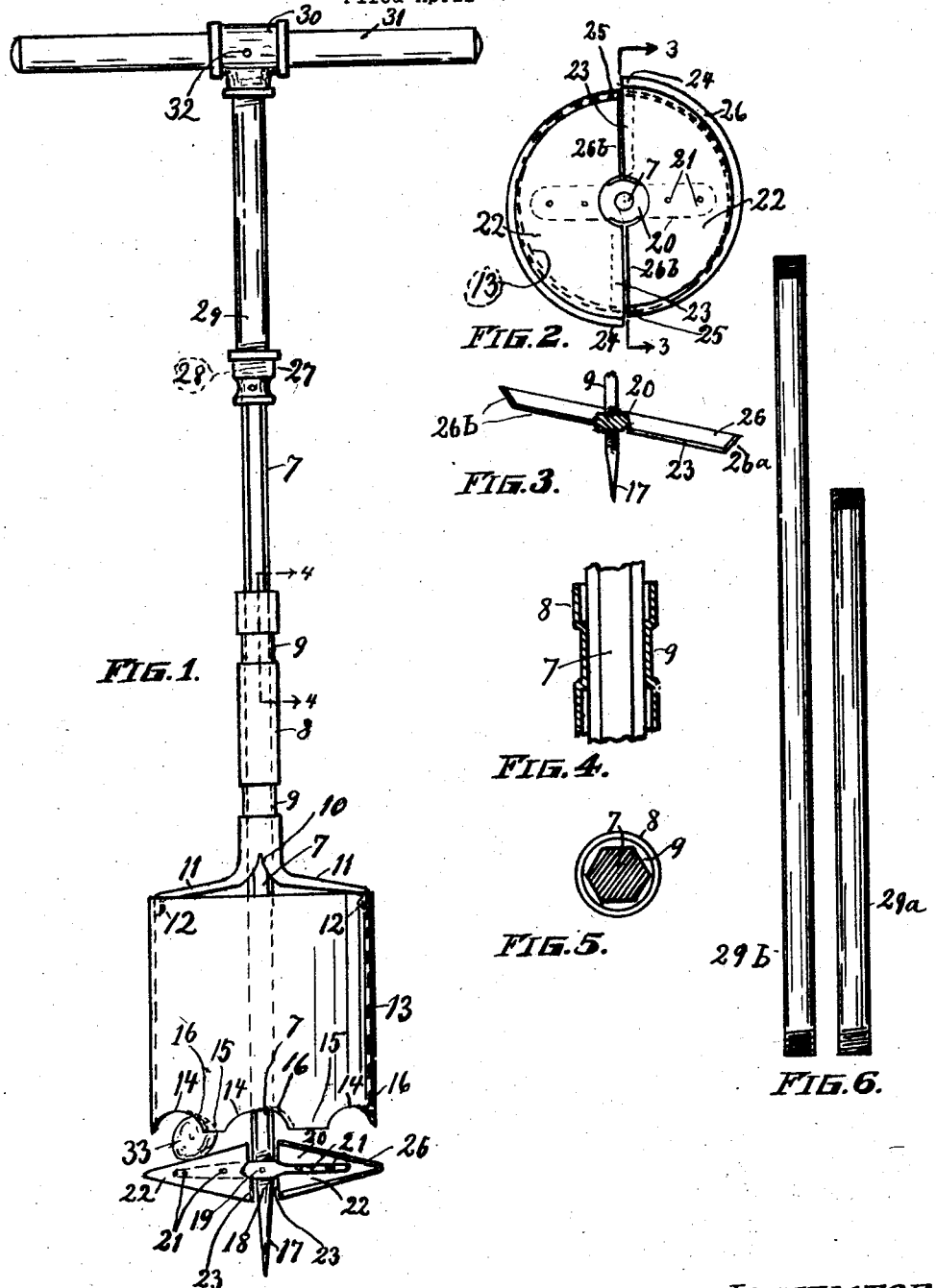

1,639,939

UNITED STATES PATENT OFFICE.

HENRY GROTHE, OF LE SUEUR CENTER, MINNESOTA.

AUGER FOR POSTHOLES AND WELLS.

Application filed April 3, 1926. Serial No. 99,509.

My invention relates to devices for digging post holes, wells and other holes in the ground for prospecting etc; and the object is to improve said class of tools by the novel construction hereinafter described and claimed, and illustrated in the accompanying drawing in which,—

Fig. 1 is a side elevation of my complete device except as to certain tubular members used for increasing the length of the tool for the boring of deep holes.

Fig. 2 is a bottom end view of Fig. 1.

Fig. 3 is a section on line 3—3 in Fig. 2 of the boring head only turned center-point downward the same as in Fig. 1.

Fig. 4 is an enlarged diametrical section on the line 4—4 in Fig. 1 with the central bar intact.

Fig. 5 is a top view of Fig. 4 with the slidable sleeve 8 intact.

Fig. 6 is a side view showing several extension tubes of varying lengths, as will presently be explained.

Referring to the drawing by reference numerals, 7 is a polygonal steel rod used as the operating or boring bar of the tool. This bar is preferably hexagonal so as to avoid cracking strain on a tubular sleeve 8, when the latter is being compressed while hot to fit and slide snugly on the operating bar. Such constructions are fairly shown at 9 in Figs. 4 and 5 and in Fig. 1 is shown that there should be two constructions so as to guide the sleeve in proper central alignment with the rod and prevent turning of the latter in the sleeve.

The lower end of the sleeve 8 is split at 10 forming two radial arms 11 which are secured by rivets 12 or like means in the upper end of a hollow open cylinder 13 which has its lower end formed with half oval notches 14 between which are formed teeth 15 having each a sharp edge 16.

The bottom end of the bar is formed with a sharp boring and guiding point 17, and secured upon it by screw threads 18, a pin 19, or other means is a two armed spider 20 on the arms of which are fixed by rivets 21 or other means two semi-circular discs 22 occupying a spirally inclined position and having each one end with a sharp front edge 23 projecting with one corner or end 24 beyond the side of the cylinder while the other end of the spiral plate comes only even with the side of the cylinder as at 25 in Fig. 2. Each of said spiral wings has its segmental edge formed with an upturned guarding flange 26 which is sharp at the end $26^a$ adjoining the cutting edge 23 while the edge $26^b$ may be dull.

To the upper end of the bar 7 is fixed a coupling 27 having in its top screw threads 28 for the lower end of a conveniently short pipe section 29, upon the top end of which is threaded the leg of a pipe T 30 in which a handle 31 is inserted and may be secured by a screw 32 or other means.

In the operation of the tool to bore a hole the point 17 is pressed into the ground and the whole device turned by the handle 31, the spiral wings 22 will then cut the earth and by the flanges 26 gather it into the cylinder, the latter being without friction at its sides will be raised by the gathered earth sufficiently to let it enter. Should there be pebbles or stones like 33 in Fig. 1, in the sand, they will be urged into the cylinder as shown as long as they are not too large to so enter the device.

When the cylinder is filled the device is pulled up and emptied on the ground. During each pulling up of the auger the spiral discs retain the earth in the cylinder.

The device is normally long enough for ordinary post hole digging and for deeper holes the tubular section is removed and replaced by a longer section like $29^a$ or $29^b$ in Fig. 6 or several sections united by couplings.

The invention is notable for the absence of several superfluous elements used in earlier post hole augers and for the presence of new structure.

What I claim is:

1. An auger of the class described the same having a normally upright boring bar with means at the top end for rotating it, said bar being polygonal in cross section and having a sharp bottom end for starting it in the ground, a spider fixed on the bar near its lower end, two oppositely arranged semicircular spirally inclined cutting blades fixed on the spider, a vertically disposed openended hollow cylinder arranged centrally above the spiral wings, said cylinder having to its upper end secured a spider having a central sleeve extending upwardly and slidable on the polygonal bar, and having one or more portions fitting the contour of the bar so as to make the cylinder rotate with the bar, each spiral blade having its outer edge turned upward and out of concentric position so as to gather the loosened earth inward and leave the cylinder to turn easy in the bore in the earth.

2. The structure specified in claim 1 in which the cylinder has several half oval notches in its lower end.

3. The structure specified in claim 1 in which the cylinder has several half oval notches in its lower end and teeth between said notches with an inward beveled sharp edge adjacent the deepest end of each notch.

In testimony whereof I affix my signature.

HENRY GROTHE.